United States Patent
Tzou

(10) Patent No.: US 9,693,387 B2
(45) Date of Patent: Jun. 27, 2017

(54) COMPATIBLE COMMUNICATION DEVICE

(71) Applicant: Vango Technologies, Inc., Hangzhou, Zhejiang (CN)

(72) Inventor: Ching-Kae Tzou, Zhejiang (CN)

(73) Assignee: VANGO TECHNOLOGIES, INC., Hangzhou, Zhejiang (CN)

( * ) Notice: Subject to any disclaimer, the term of this patent is extended or adjusted under 35 U.S.C. 154(b) by 0 days.

(21) Appl. No.: 14/944,492

(22) Filed: Nov. 18, 2015

(65) Prior Publication Data
US 2016/0345382 A1 Nov. 24, 2016

(30) Foreign Application Priority Data
May 22, 2015 (CN) .......................... 2015 1 0269009

(51) Int. Cl.
*H04M 9/00* (2006.01)
*H04W 88/06* (2009.01)
(Continued)

(52) U.S. Cl.
CPC .............. *H04W 88/06* (2013.01); *H04B 3/54* (2013.01); *H04L 27/0002* (2013.01)

(58) Field of Classification Search
CPC ................................. H04L 1/0003; H04B 1/38
See application file for complete search history.

(56) References Cited

U.S. PATENT DOCUMENTS

2006/0018278 A1* 1/2006 Grasfield ............... H04M 11/06
370/330

2007/0167144 A1* 7/2007 Koga ..................... H04B 3/542
455/402
(Continued)

FOREIGN PATENT DOCUMENTS

CN 1423493 A 6/2003
CN 103297137 A 9/2013
(Continued)

OTHER PUBLICATIONS

Summary of the 1st Office Action for CN201510269009.7, mailed Dec. 2, 2016.

*Primary Examiner* — Edward Urban
*Assistant Examiner* — Max Mathew
(74) *Attorney, Agent, or Firm* — Yue Xu; U.S. Fairsky LLP

(57) ABSTRACT

A compatible communication device includes an analog front end, a baseband communication unit, a wireless radio frequency module, a power line communication front end and a control unit. The analog front end is connected to each of the baseband communication unit, the wireless radio frequency module and the power line communication front end. The baseband communication unit transmits baseband signals. The analog front end performs signal conversion between digital domain and analog domain. The control unit selects, based on the channel quality for signal transmission, one or two of the power line communication front end and the wireless radio frequency module for communication. The signal receiving or transmission is performed through a power line if the power line communication front end is selected for communication. Or, the signal receiving or transmission is performed through a wireless channel if the wireless radio frequency module is selected for communication.

4 Claims, 2 Drawing Sheets

(51) Int. Cl.
  *H04B 3/54*     (2006.01)
  *H04L 27/00*    (2006.01)

(56) References Cited

U.S. PATENT DOCUMENTS

| | | | | |
|---|---|---|---|---|
| 2009/0179503 A1* | 7/2009 | Yoshioka | ................ | H02J 1/00 307/149 |
| 2013/0099938 A1* | 4/2013 | Borisov | ............... | H04B 1/0003 340/870.02 |
| 2014/0104088 A1* | 4/2014 | Nagasawa | ........ | H03K 19/09432 341/144 |
| 2014/0307811 A1 | 10/2014 | Han et al. | | |
| 2015/0249468 A1* | 9/2015 | Nikkila | ................ | G10L 19/005 714/746 |

FOREIGN PATENT DOCUMENTS

| | | |
|---|---|---|
| CN | 103312367 A | 9/2013 |
| WO | 2013016271 A2 | 1/2013 |

\* cited by examiner

COMPATIBLE COMMUNICATION DEVICE

CROSS REFERENCES OF RELATED APPLICATIONS

The present application claims the priority to Chinese Patent Application No. 201510269009.7, titled "COMPATIBLE COMMUNICATION DEVICE", filed on May 22, 2015 with the State Intellectual Property Office of People's Republic of China, which is incorporated herein by reference in its entirety.

FIELD

The present disclosure relates to the field of communication system, and in particular to a compatible communication device.

BACKGROUND

Power line communication (PLC) is a general designation of all technologies in which power lines are used as communication channels. A PLC communication system transmits data via modulated communication signals on existing power lines, and the power lines are also used to supply power to residences, buildings and other places. In this case, the communication devices can be networked without newly added wires or cables. This feature is widely used in various applications, since a higher efficiency is obtained by taking full advantage of the network. Generally, the PLC technology is applied to public utility meters, home local area networks, household appliances and illumination control.

A unidirectional output power design is adopted in the power lines so far, and the transmission environment for communication signal propagation is severe. It is observed in narrow band power line communication (NB-PLC) that power line noise is a key factor resulting in a severe propagation environment. Typical sources of the PLC noise include: switching power supply, silicon controlled rectifier, commutator motor, dimming switch, and industrial source directly connected to supply network.

In order to improve the reliability of meter reading technology, a wireless communication technology may be adopted instead of the PLC. However, for the wireless communication technology, even in case of close physical distance, it is still difficult for communication devices in some regions to perform the wireless communication normally. For example, some obstacles in the basement of a building may block or weaken the radio wave, which makes it difficult to ensure the quality of the wireless communication.

SUMMARY

In view of the above, the major object of the present disclosure is to provide a compatible communication device, in which one or two of a wireless communication mode and a power line communication mode are selected for communication based on the channel quality in which a signal is transmitted, to improve the communication reliability.

In order to achieve the above object, a compatible communication device is provided according to the present disclosure, which includes an analog front end, a baseband communication unit, a wireless radio frequency module, a power line communication front end and a control unit. where the analog front end is connected to each of the baseband communication unit, the wireless radio frequency module and the power line communication front end;

the baseband communication unit is configured to transmit baseband signals;

the analog front end is configured to perform signal conversion between digital domain and analog domain;

the power line communication front end is configured to perform signal receiving or transmission via a power line;

the wireless radio frequency module is configured to perform signal receiving or transmission via a wireless network; and the control unit is configured to select the power line communication front end and/or the wireless radio frequency module to perform signal receiving or transmission.

Preferably, the compatible communication device further includes:

a transceiver unit configured to perform signal receiving or transmission.

Preferably, the wireless radio frequency module is a protocol-transparent radio frequency module.

Preferably, the wireless radio frequency module includes a multi-band antenna sub-module, a radio frequency transmission sub-module and a radio frequency receiving sub-module;

the multi-band antenna sub-module is configured to transmit or receive an antenna signal in a preset frequency band.

Preferably, the power line communication front end includes a transformer, a line drive sub-module and an analog circuit, where the analog circuit is configured to couple a signal received from the power line and to couple a signal transmitted to the power line.

Preferably, the control unit activates the power line communication front end if the power line communication front end is selected to perform signal receiving or transmission.

Preferably, the control unit activates the wireless radio frequency module if the wireless radio frequency module is selected to perform signal receiving or transmission.

The compatible communication device according to the present disclosure includes an analog front end, a baseband communication unit, a wireless radio frequency module, a power line communication front end and a control unit. The analog front end is connected to each of the baseband communication unit, the wireless radio frequency module and the power line communication front end. The baseband communication unit is configured to transmit baseband signals. The analog front end performs signal conversion between digital domain and analog domain. The control unit selects, based on the channel quality for signal transmission, one or two of the power line communication front end and the wireless radio frequency module for communication. The signal receiving or transmission is performed through a power line if the communication is performed using the power line communication front end, and the signal receiving or transmission is performed through a wireless channel if the communication is preformed using the wireless radio frequency module. With the compatible communication device according to the present disclosure, an appropriate channel may be selected for communication based on different signal transmission situations or different channel qualities, thereby improving the communication reliability.

BRIEF DESCRIPTION OF THE DRAWINGS

The appended drawings to be used in the description of the embodiments or the conventional technology will be described briefly as follows, so that the technical solutions according to the embodiments of the present disclosure or according to the conventional technology will become clearer. It is obvious that the appended drawings in the following description only illustrate some embodiments of the present disclosure. For those skilled in the art, other appended drawings may be obtained according to these appended drawings without any creative work.

DETAILED DESCRIPTION

The technical solution according to the embodiments of the present disclosure will be described clearly and completely as follows in conjunction with the appended drawings. It is obvious that the described embodiments are only a few rather than all of the embodiments according to the present disclosure. Any other embodiments obtained by those skilled in the art based on the embodiments in the present disclosure without any creative work fall in the scope of the present disclosure.

Figure 1:
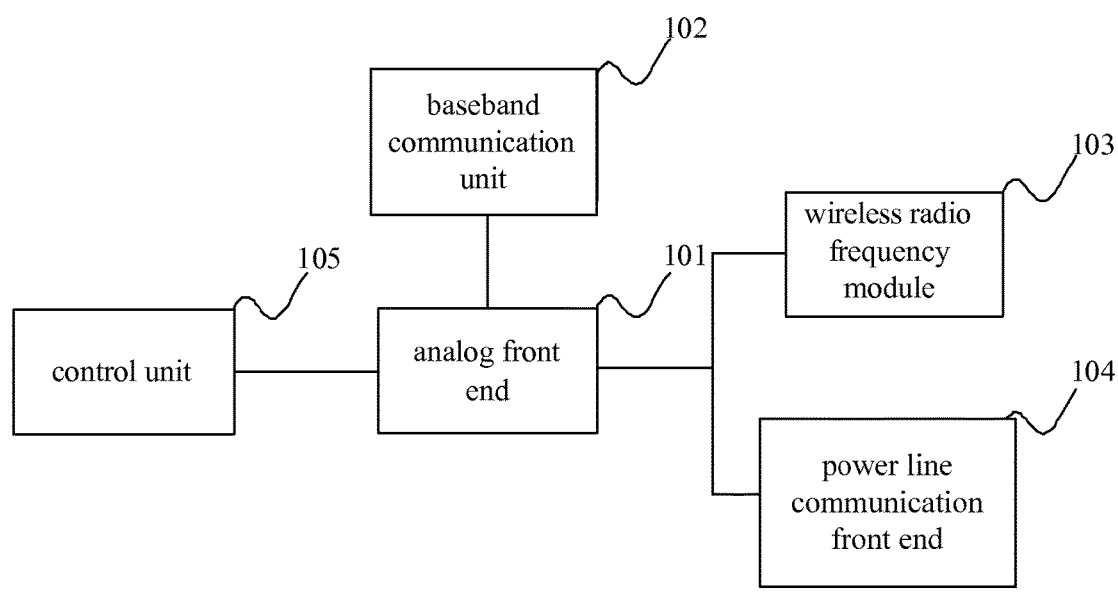
FIG. 1 is a schematic structural diagram of a compatible communication device according to a first embodiment of the present disclosure.

A compatible communication device is provided according to the present disclosure. FIG. 1 shows a schematic structural diagram of a compatible communication device according to a first embodiment of the present disclosure. The compatible communication device includes an analog front end 101, a baseband communication unit 102, a wireless radio frequency module 103, a power line communication front end 104 and a control unit 105.

The analog front end 101 is connected to each of the baseband communication unit 102, the wireless radio frequency module 103 and the power line communication front end 104.

The baseband communication unit 102 is configured to transmit baseband signals.

The analog front end 101 is configured to perform signal conversion between digital domain and analog domain.

The power line communication front end 104 is configured to perform signal receiving or transmission via a power line.

The wireless radio frequency module 103 is configured to perform signal receiving or transmission to through a wireless network.

The control unit 105 is configured to select the power line communication front end and/or the wireless radio frequency module to perform signal receiving or transmission.

In this embodiment, processing for baseband signals or higher layer protocol stack is performed in the baseband communication unit 102 which is compatible with one or more power line communication standards. The analog front end 101, which performs the signal conversion between the digital domain and the analog domain, is connected to the power line communication front end and the wireless radio frequency module by using different signal conversion circuits and interfaces, and connect the baseband communication unit 102 to the wireless radio frequency module 103 and the power line communication front end 104 through different communication channels to implement the signal receiving or transmission. The control unit 105 selects, based on a current communication environment, one or two of the power line communication front end 104 and the wireless radio frequency module 103 for communication. In this way, a wireless channel is selected in a case of a poor signal transmission environment, a power line channel is selected in a case of encountering an obstacle, or both of the two channels are used to increase the throughput. In a case that both the two channels are used, a common signal frame and upper layer protocol stack can be adopted in these two channels in a communication with a target node in the network. In another case that both the two channels are used, different signal frames or upper layer protocol stacks are adopted in these two channels in a communication with a target node in the network.

In the compatible communication device according to an embodiment, the analog front end is connected to each of the baseband communication unit, the wireless radio frequency module and the power line communication front end. The baseband communication unit transmits baseband signals. The analog front end performs the signal conversion between the digital domain and the analog domain. The control unit selects, based on the quality of the channel for the signal transmission, one or two of the power line communication front end and the wireless radio frequency module for communication. The signal receiving or transmission is performed through a power line if the communication is performed with the power line communication front end, or the signal receiving or transmission is performed through the wireless channel if the communication is performed with the wireless radio frequency module. In this way, an appropriate channel can be selected for communication based on different signal transmission situations or different channel qualities, thereby improving the communication reliability.

Figure 2:
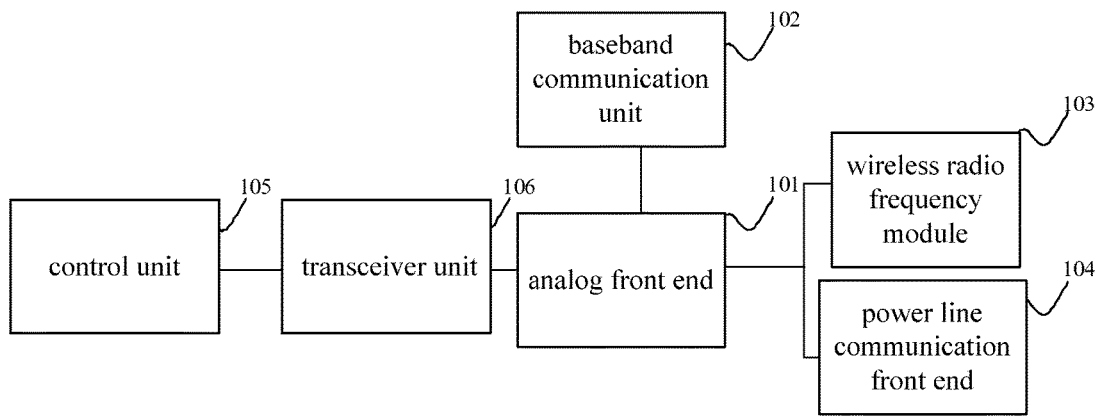
FIG. 2 is a schematic structural diagram of a compatible communication device according to a second embodiment of the present disclosure.
Figure 3:
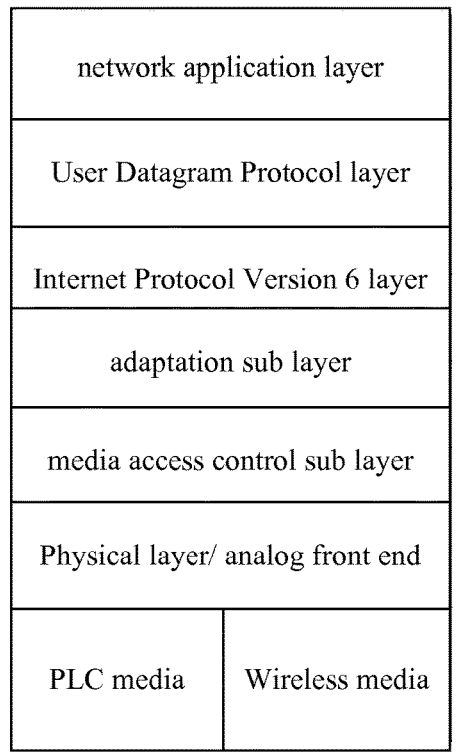
FIG. 3 is a diagram of a communication structure in a compatible communication device according to an embodiment of the present disclosure

FIG. 2 shows a schematic structural diagram of a compatible communication device according to a second embodiment of the present disclosure. As compared with the compatible communication device in FIG. 1, the compatible communication device in FIG. 2 further includes a transceiver unit 106 configured to for signal receiving or transmission.

As compared with the first embodiment, in a compatible communication device according to this second embodiment, the wireless radio frequency module is a protocol-transparent radio frequency module;

the wireless radio frequency module includes a multi-band antenna sub-module, a radio frequency transmission sub-module and a radio frequency receiving sub-module;

the multi-band antenna sub-module is configured to transmit or receive an antenna signal in a preset frequency band; and a frequency range of the multiband antenna sub-unit is generally not limited, and a main working frequency band includes: 315 MHz, 433 MHz, 868 MHz and 915 MHz and the like.

The power line communication front end includes a transformer, a line drive sub-module and an analog circuit, where the analog circuit is configured to couple a signal received from the power line and to couple a signal transmitted to the power line; and the power line communication front end conforms to at least one narrow band power line communication standard such as IEEE1901.2, PRIME, G3 and G.hnem. A protocol stack for the baseband signal also conforms to the above standard.

In this embodiment, in a case that the device can not communicate with other nodes in the network due to poor power line transmission or reception environment, the control unit selects the wireless radio frequency module for signal receiving or transmission through a wireless channel.

In a case that the device has difficulty to reach a target device due to blocking of an obstacle in wireless communication channel, the control unit selects the power line communication front end for signal receiving or transmission through a power line.

In a case that communication with a target node in the network is performed through both the wireless communication path and the power line communication path to increase throughput, a common signal frame and upper layer protocol stack can be adopted in these two paths.
In an alternative case that communication with a target node in the network is performed through both the wireless communication path and the power line communication path to increase throughput, different signal frames or upper layer protocol stacks can be adopted in these two communication paths.

It should be noted that, the embodiments in this specification are described in a progressive way, each of which emphasizes the differences from others, and the same or similar parts among the embodiments can be referred to each other.

Finally, it should be noted that terms of "include", "comprise" or any other variants are intended to be non-exclusive. Therefore, a process, method, article or device including a plurality of elements includes not only the disclosed elements but also other elements that are not clearly enumerated, or also include inherent elements of the process, method, article or device. Unless expressively limited otherwise, the statement "including a . . . " does not exclude the case that other similar elements may exist in the process, method, article or device other than enumerated elements.

The systems according to the embodiments of the disclosure are introduced in detail above, the principles and implementing ways of the disclosure are clarified by specific examples, and the above illustration of the embodiments is only to help to understand the method and key idea of disclosure. In addition, those skilled in the art may make changes to the specific embodiments and the application scope based on the idea of the disclosure. In summary, the specification should not be understood as limitations to the disclosure.

The invention claimed is:

1. A compatible communication device comprising: an analog front end, a baseband communication unit, a wireless radio frequency module, a power line communication front end, a control unit and a transceiver unit, wherein:
   the analog front end is connected to each of the baseband communication unit, the wireless radio frequency module and the power line communication front end;
   the baseband communication unit is configured to transmit baseband signals;
   the analog front end is configured to perform signal conversion between digital domain and analog domain;
   the power line communication front end is configured to perform signal receiving or transmission via a power line;
   the wireless radio frequency module is configured to perform signal receiving or transmission via a wireless network;
   the control unit is configured to select the power line communication front end and/or the wireless radio frequency module to perform signal receiving or transmission; and
   the transceiver unit is configured to perform signal receiving or transmission;
   wherein the wireless radio frequency module comprises a multi-band antenna sub-module, a radio frequency transmission sub-module and a radio frequency receiving sub-module; and
   wherein the multi-band antenna sub-module is configured to transmit or receive an antenna signal in a preset frequency band;
   wherein the power line communication front end comprises a transformer, a line drive sub-module and an analog circuit, wherein the analog circuit is configured to couple a signal received from the power line and to couple a signal transmitted to the power line.

2. The compatible communication device according to claim 1, wherein the wireless radio frequency module is a protocol transparent radio frequency module.

3. The compatible communication device according to claim 1, wherein the control unit activates the power line communication front end if the power line communication front end is selected to perform signal receiving or transmission.

4. The compatible communication device according to claim 1, wherein the control unit activates the wireless radio frequency module if the wireless radio frequency module is selected to perform signal receiving or transmission.

* * * * *